(12) United States Patent
Preston

(10) Patent No.: US 12,400,379 B1
(45) Date of Patent: Aug. 26, 2025

(54) SYSTEMS AND METHODS FOR LARGE DATA SET VISUALIZATION AND ANOMALY ANALYSIS

(71) Applicant: UIPCO, LLC, San Antonio, TX (US)

(72) Inventor: Benjamin R. Preston, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 189 days.

(21) Appl. No.: 18/362,420

(22) Filed: Jul. 31, 2023

(51) Int. Cl.
  *G06T 11/20* (2006.01)
  *G06F 16/26* (2019.01)
  *G06F 17/18* (2006.01)

(52) U.S. Cl.
  CPC ........... *G06T 11/206* (2013.01); *G06F 16/26* (2019.01); *G06F 17/18* (2013.01); *G06T 2200/24* (2013.01)

(58) Field of Classification Search
  CPC ... G06T 11/206; G06T 2200/24; G06F 16/26; G06F 17/18
  See application file for complete search history.

(56) References Cited

U.S. PATENT DOCUMENTS

2023/0084735 A1\* 3/2023 Jacob ............... G16H 20/10
702/19

OTHER PUBLICATIONS

Florian Heimerl, Chih-Ching Chang, Alper Sarikaya, and Michael Gleicher, Member, IEEE, Visual Designs for Binned Aggregation of Multi-Class Scatterplots, Jan. 14, 2020, arXiv preprint arXiv:1810. 02445v2, pp. 1-14. (Year: 2020)*

\* cited by examiner

*Primary Examiner* — Jeffery A Brier
(74) *Attorney, Agent, or Firm* — BakerHostetler

(57) ABSTRACT

Systems and methods provide for charting of efficient charting of bivariate pair plots by coarsening data. Coarsening data includes assigning data entries to groups according to ranges of variable values. The number of entries in a group can be represented with an indicator. Anomalous data can be identified using a multivariate-normal probability density function.

20 Claims, 13 Drawing Sheets

|  | Number of Transactions In | Number of Transactions Out | Total Transactions Per Day | Value of Transactions In Per Day | Value of Transactions Out Per Day |
|---|---|---|---|---|---|
| Customer 1 | 721 | 987 | 153 | 50171 | 86620 |
| Customer 2 | 1056 | 1036 | 277 | 79448 | 25103 |
| Customer 3 | 217 | 589 | 244 | 90085 | 58223 |
| Customer 4 | 218 | 184 | 247 | 78566 | 88185 |
| Customer 5 | 806 | 282 | 271 | 71944 | 62528 |
| ... | ... | ... | ... | ... | ... |
| Customer 999 | 117 | 607 | 231 | 15431 | 66375 |

FIG. 1A

|  | Customer Age | Customer Address Zone | Current Deposit Balance | Total Transactions In | Total Transactions Out |
|---|---|---|---|---|---|
| Customer 1 | 63 | 21217 | 137681 | 334 | 661 |
| Customer 2 | 60 | 20304 | 163180 | 813 | 715 |
| Customer 3 | 63 | 6925 | 73481 | 749 | 478 |
| Customer 4 | 72 | 32267 | 137788 | 470 | 455 |
| Customer 5 | 63 | 3719 | 64931 | 90 | 357 |
| ... | ... | ... | ... | ... | ... |
| Customer 999 | 84 | 3655 | 112510 | 437 | 250 |

FIG. 1B

SYSTEMS AND METHODS FOR LARGE DATA SET VISUALIZATION AND ANOMALY ANALYSIS

TECHNICAL FIELD

The innovations disclosed herein relate to data analysis and more particularly to visualizing data and identifying anomalous data.

BACKGROUND

With the vast quantities of data available to modern enterprises, analyzing the data becomes increasingly challenging. Visualization is one way to permit better understanding of large pools of data. Pair plots, which plot points on a chart based on the concurrent values of two variables, can be used to visualize bivariate distributions of data. Pair plots allow a viewer to identify groups or clusters of points as well as individual points falling outside groups or clusters, which may be anomalous.

Despite this usefulness, pair plots do not scale with "big data." As the numbers of rows and/or columns in tabulated data grows to millions, billions, or even trillions, plotting the data no longer permits appreciation of the dataset because points will be plotted on top of one another or blurred together such that the number of points in a given area cannot be discerned. Even if the points were shrunk to single-pixel size—making viewing challenging—modern 4K monitors only have about 8 million pixels (e.g., 3840×2160=8,294,400).

Beyond the diminishing usefulness of plotting more points than available (or comprehensible) resolution, plotting hundreds of thousands or more points consumes significant computing resources in terms of processor, memory, graphics processing unit, et cetera. Because these points are bottlenecked to a single output, the plotting cannot be parallelized, resulting in excessively slow plotting of standard pair plots.

One attempt to resolve this issue involves sampling large datasets, selecting an arbitrary number of random dataset members to analyze. However, sampling necessarily misses anomalies, or, if they are selected in small sample sizes, may overrepresent them.

SUMMARY

In an embodiment, a method comprises accessing a database including a first variable and a second variable and a plurality of entries associated with the first variable and the second variable, wherein each of the plurality of entries contains a first value corresponding to the first variable and a second value corresponding to the second variable; coarsening the plurality of entries by assigning each first value to one of a first plurality of bins and assigning each second value to one of a second plurality of bins, wherein each of the first plurality of bins corresponds to a range of values for each first value and each of the second plurality of bins corresponds to a range of values for each second value; and rendering a chart depicting a visualization of pair plots of the first plurality of bins against the second plurality of bins, wherein each pair plot covers an area of the chart encompassing where each range of values would be plotted, and wherein the visualization of the plurality of bins respectively includes an indicator of a number of entries represented by each of the plurality of bins.

In an embodiment, a system comprises a data interface module configured to access a database including a first variable and a second variable and a plurality of entries associated with the first variable and the second variable, wherein each of the plurality of entries contains a first value corresponding to the first variable and a second value corresponding to the second variable a coarsening module configured to coarsen the plurality of entries by assigning each first value to one of a first plurality of bins and assigning each second value to one of a second plurality of bins, wherein each of the first plurality of bins corresponds to a range of values for each first value and each of the second plurality of bins corresponds to a range of values for each second value; and a rendering module configured to render a chart depicting a visualization of pair plots of the first plurality of bins against the second plurality of bins, wherein each pair plot covers an area of the chart encompassing where each range of values would be plotted, and wherein the visualization of the plurality of bins respectively includes an indicator of a number of entries represented by each of the plurality of bins.

In an embodiment, a non-transitory computer-readable medium is provided. The non-transitory computer-readable medium stores instructions that when executed by a processor perform operations. The operations effectuate: accessing a database including a first variable and a second variable and a plurality of entries associated with the first variable and the second variable, wherein each of the plurality of entries contains a first value corresponding to the first variable and a second value corresponding to the second variable; coarsening the plurality of entries by assigning each first value to one of a first plurality of bins and assigning each second value to one of a second plurality of bins, wherein each of the first plurality of bins corresponds to a range of values for each first value and each of the second plurality of bins corresponds to a range of values for each second value; and rendering a chart depicting a visualization of pair plots of the first plurality of bins against the second plurality of bins, wherein each pair plot covers an area of the chart encompassing where each range of values would be plotted, and wherein the visualization of the plurality of bins respectively includes an indicator of a number of entries represented by each of the plurality of bins.

The details above in this Summary are intended to describe only some aspects relating to certain embodiments of the innovations herein, and should not be deemed in any way limiting with respect to requiring or omitting any aspect for embodiments to be claimed or otherwise limiting the disclosure or embodiments keeping with its scope or spirit.

BRIEF DESCRIPTION OF THE DRAWINGS

FIG. 1A depicts example data that can be used in connection with innovations disclosed herein.

FIG. 1B depicts example data that can be used in connection with innovations disclosed herein.

Figure 1C:
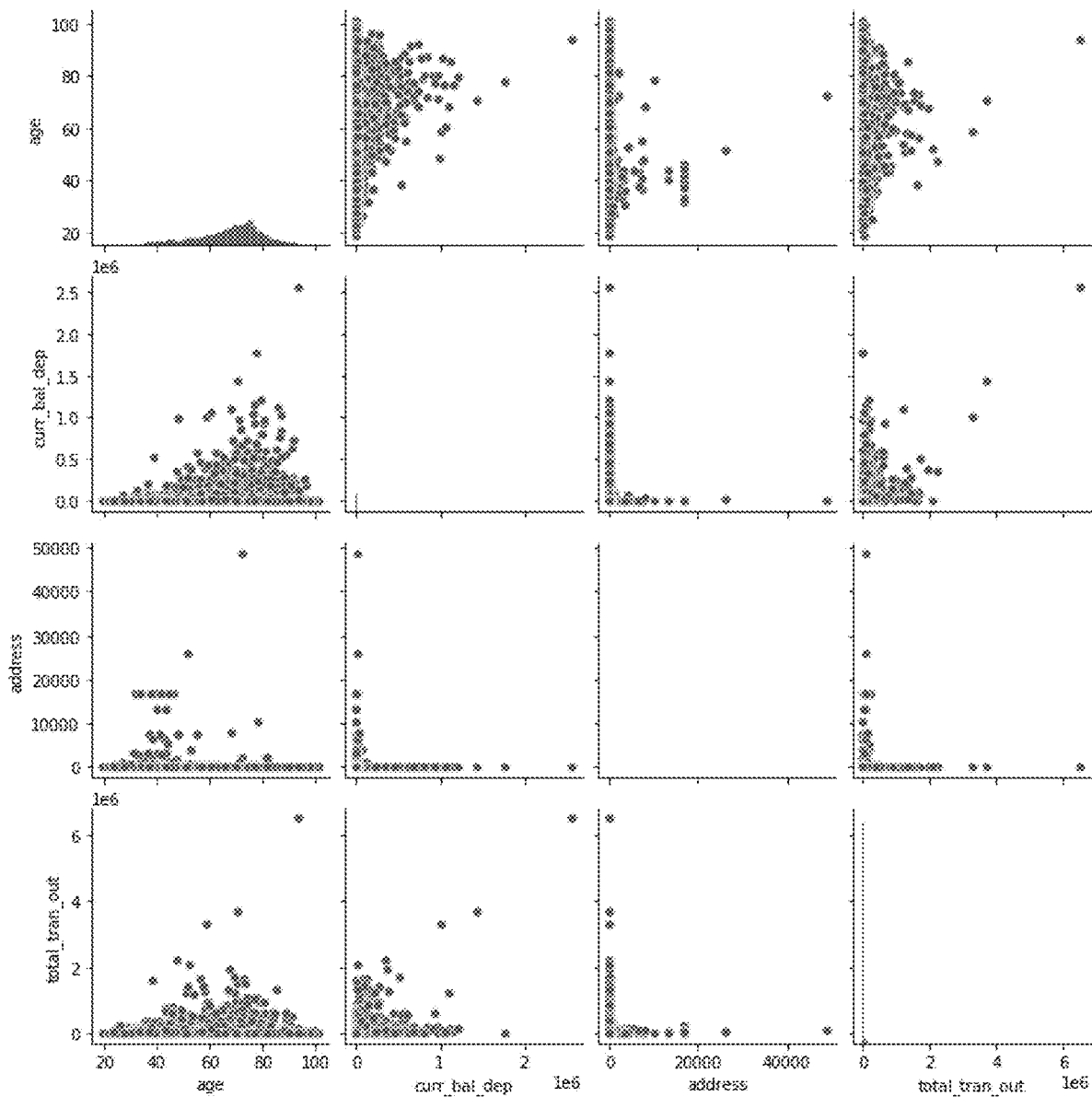
FIG. 1C depicts example charts for visualizing data used in connection with innovations disclosed herein.

The details above in the Brief Description of the Drawings are intended to describe only some aspects relating to certain embodiments of the innovations herein, and should not be deemed in any way limiting with respect to requiring or omitting any aspect for embodiments to be claimed or otherwise limiting the disclosure or embodiments keeping with its scope or spirit.

DETAILED DESCRIPTION

Vast amounts of data are available relating to many lines of business. The data can have various attributes, and a particular data point can be a value or representation given a particular situation (e.g., time, condition, entity, et cetera). For example, for a banking customer, data points can include a number of transactions per unit time (hour, day, week, et cetera), the average transaction value over a time period, the total transaction value over a time period, the largest transaction value over a time period, et cetera. This data can be conceptualized or stored in spreadsheets with rows and columns. Continuing with the above example, each row of a spreadsheet may refer to a particular customer (or subset of customer data), and each column can correspond to the representation or value, such that each cell provides the data for that customer given the parameters.

To analyze data, pair plots compare or plot the values for one variable (e.g., of one column in embodiments conceptualized as spreadsheets) against the values for another variable (e.g., of a second column in embodiments conceptualized as spreadsheets); this is done for each pair of variables. This allows data analysts to look at trends in terms of how different variables correlate to identify outliers.

FIG. 1A and FIG. 1B illustrate examples of how data might be arranged. The variables listed (e.g., columns) and rows (e.g., customers), along with the values in the cells and numbers of columns and/or rows, are for example purposes only. Frequently, tens of thousands of customers may be listed in each segment. FIG. 1A may for example be a list of business customers, while FIG. 1B may be a list of individual customers in a retired segment. In embodiments, rows could also be time periods, geographies, or other segments or sub-segments of populations where data is available. These example data tables should not be deemed in any way limiting, and can in embodiments include a potentially unbounded number of rows and/or columns. While FIG. 1A and FIG. 1B show rows up to 999, in reality many such data sets will include thousands or even millions of entries, making the analysis, plotting, and visualization of data more complex.

While data herein is described in terms of rows and columns, it is understood that such datasets can be represented in other manners. "Rows" can generally refer to particular subsets of data for variables (e.g., users, time periods, geographies, and so forth), and "columns" can generally refer to variables (e.g., numbers of transactions, values of transactions, age, address, and so forth). Alternatively, variables and entries corresponding to individual values for those variables could be flipped in terms of rows and columns, or stored in a non-tabular manner, without departing from the scope or spirit of the innovation.

FIG. 1C illustrates the challenges of presenting visualizations to analyze datasets such as those described in FIG. 1A and FIG. 1B. The example plots shown in FIG. 1C can be example bivariate plots of variable values (e.g., corresponding data pairs from two columns in a row of data arranged as shown in FIG. 1A and FIG. 1B). Each point represents a pair plot with one variable on a first axis and a second variable on a second axis. Such pair plots can be shown in groups as illustrated in FIG. 1C to allow for the different variables to be compared. For example, in the illustrated example of FIG. 1C, four variables are plotted against one another, resulting in twelve bivariate plots. The diagonal (e.g., first column of the top row, second column of the second row, third column of the third row, and last column of the bottom row) represents the variable plotted against itself, and therefore only shows a distribution or nothing.

Figure 1D:
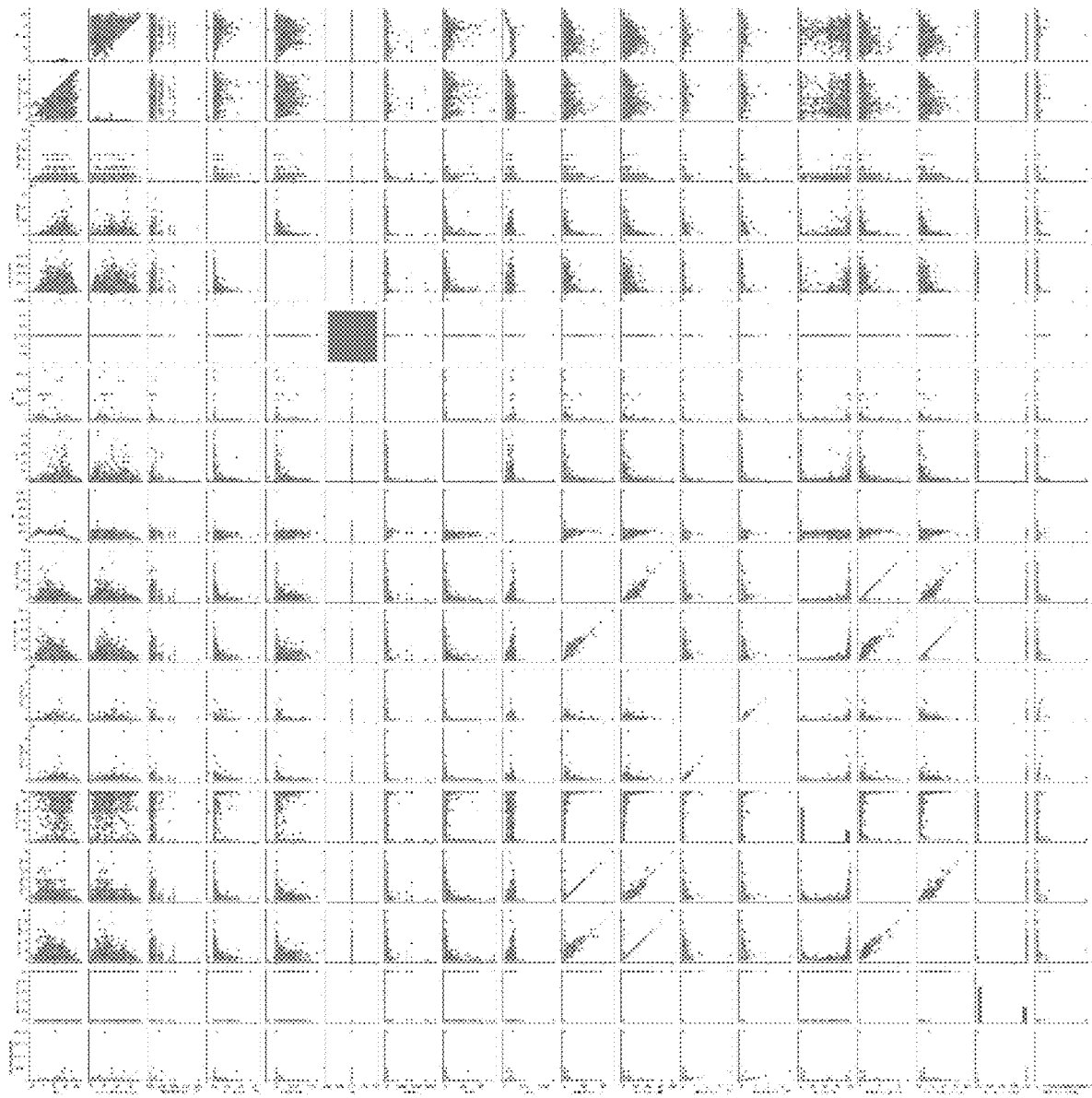
FIG. 1D depicts example charts for visualizing data used in connection with innovations disclosed herein.

FIG. 1D further emphasizes the challenges of reviewing large bodies of data. FIG. 1D shows example pair plots for an 18-column (or 18-variable) dataset including 10,000 rows (or points per variable). By plotting each and every variable against the next, it becomes extremely time consuming and/or computationally difficult based on the number of rows and the number of columns. The computational difficulty can scale with the square of the number of columns or variables because anomaly detection reviews pairs of variables . . . (FIG. 1D is provided only to serve as an illustrative example of plots that would be rendered and reviewed for an 18-variable dataset with a large number of values per variable. FIG. 1D does not include any text or other detail relevant to the illustrative example.)

As can be appreciated from the bivariate plots, it is difficult for someone utilizing a bivariate plot visualization to understand the number or density of plots as they overlay one another or run together such that one plot cannot be distinguished from others and the trends or densities of plots in a given range cannot be understood visually (e.g., "overplotting"). As such, where outliers or anomalous pairs occur may be difficult to discern. The points for plotting can potentially span into millions of points. Plotting millions of points individually in a manner that they can be viewed separately would exceed display resolutions or require display sizes permitting comprehension by human viewers.

Example use cases employing data described herein can include, e.g., fraud detection, sales metrics, marketing reach, underwriting, pricing, valuation, or other use cases pertaining to the business of diversified financial services companies. Use cases can also extend beyond financial services, and can relate to any application where anomaly detection or investigation can assist with management or improvement, such as, e.g., manufacturing, medicine, engineering, agriculture, food service, retail, education, real estate, mining, logistics, telecommunications, software, human resources, et cetera.

Figure 2:
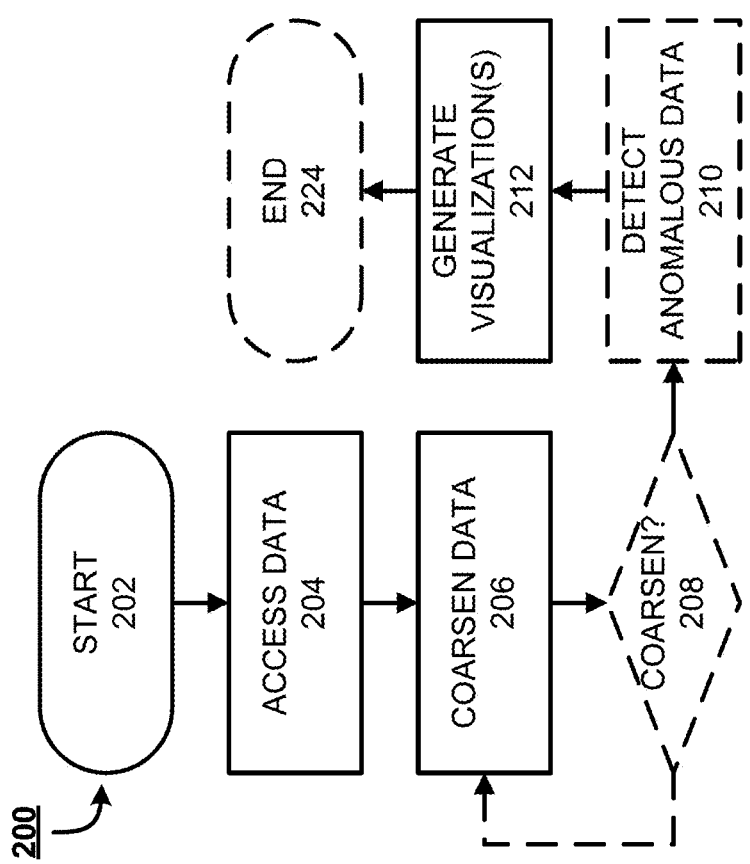
FIG. 2 depicts an example methodology disclosed herein.

FIG. 2 illustrates an example method 200 to address these issues. Method 200 provides techniques for aggregating or summarizing points, reducing cardinality among the range of values from potentially billions in large data sets to dozens or fewer. In some embodiments, methodology 200 can also identify anomalous data. In embodiments, methodology 200 can identify anomalous data using a multivariate-normal (MVN) probability density function (PDF).

Methodology 200 begins at 202 and proceeds to 204 where data is ingested or accessed from one or more databases. In embodiments, ingesting or accessing data can include accessing a database including a first variable and a second variable and a plurality of entries associated with the first variable and the second variable, wherein each of the plurality of entries contains a first value corresponding to the first variable and a second value corresponding to the second variable.

Methodology 200 then proceeds to 206 where the ingested data is coarsened. In embodiments, coarsening can include coarsening the plurality of entries by assigning each first value to one of a first plurality of bins and assigning each second value to one of a second plurality of bins, wherein each of the first plurality of bins corresponds to a range of values for each first value and each of the second plurality of bins corresponds to a range of values for each second value.

Coarsening the data can solve the lack of scalability in datasets with a large number of rows (or, e.g., number of different values or entries per variable). In embodiments, coarsening can be performed using a decision tree that coarsens the data into a relatively small number of "bins" or "areas." Such bins or areas can be defined by a leaf of a decision tree. Reducing the number of individual values can obviate problems relating to computationally rendering and physically displaying the chart representing tens of thousands (or more) points defined by pair plots where each value would define a point on an axis of the pair plot. While decision trees are described, other means of coarsening can be utilized without departing from the scope or spirit of the innovation. For example, different machine learning algorithms can be employed. In alternative or complementary embodiments, a k-means clustering algorithm could be used. In alternative or complementary embodiments, algorithms can determine a number of bins such that each bin has the same number of points therein, or that the point distribution among bins is weighted according to, e.g., standard deviations or other statistical analyses of the dataset.

In embodiments, values can be represented using a floating point number in scientific notation, and the number can be truncated after a certain decimal, to facilitate coarsening or discretization. The truncation can occur after any decimal point depending on the number of points and desired number of bins or areas representing coarsened data. Plotting this coarsened data becomes less computationally intensive due to the reduced precision required to determine the location of each plot (whether for plotting or for determining a coarsened bin to which the point should be captured in).

In embodiments, coarsening can include a separate aspect of partitioning to define bins before the data is coarsened to fit into those bins. A bin can be a set within a partition, and the union of all of the bins can be all possible values that a variable associated with the bins can take. The partitioning and defining of bins allows coarsening to comprise coarsening the values of the variables to fit within preexisting bins. In alternative embodiments coarsening can include defining the bins, or defining bins and coarsening variable values can be performed more than once to adjust bins based on the results of coarsening.

FIG. 4A, FIG. 4B, FIG. 4C, and FIG. 4D illustrate examples of coarsening using decision trees based on the number of leaves. As opposed to representing each instance of each value according to the cumulative count, stepped bars represent a decision tree leaf (defining, e.g., an area or bin). All of the values occurring along the horizontal axis along the horizontal portion of the step fall within the same bin, and the cumulative count of instances having variable values within that range are counted to identify the number of points falling within the bin. Decision trees to aggregate or summarize points for coarsening can be used to approximate each variable's (or column's) Empirical Cumulative Distribution Function (ECDF).

Methodology 200 can optionally proceed to 208 where a determination can be made as to whether the data's cardinality has been reduced to an appropriate level. If a determination is made that the cardinality is too high, in embodiments, 208 can include coarsening the plurality of entries by assigning each first value to one of a third plurality of bins and assigning each second value to one of a fourth plurality of bins, wherein each of the third plurality of bins corresponds to a range of values for each first value and each of the fourth plurality of bins corresponds to a range of values for each second value, wherein the number of bins in the third plurality of bins is less than a number of bins in the second plurality of bins, and wherein the number of bins in the fourth plurality of bins is less than a number of bins in the first plurality of bins.

In an embodiment that determine an appropriate cardinality level, the number of bins or areas can be set to an amount related to a proportion of a screen size or resolution. For example, a number of bins can be selected to plot all bins or areas in a single display with bin sizes of 20×20 pixels or larger. In embodiments, a cardinality can be selected, or can be user selectable. In embodiments, the number of areas or bins can be changed after rendering to allow for re-rendering based on a user input or determinations pertaining to a number or proportion of anomalous variables or pair plots (see infra).

Methodology 200 can, after or in lieu of 208, optionally proceed to 210 where a determination is made as to what data is anomalous. While visualization of data is valuable to anomaly investigation, it may be difficult for a user to understand whether a data point is a maximum or minimum, but not anomalous, or actually anomalous, based solely on a visualization of plots with similar appearances.

Determining the probability of a particular pair plot occurring can be performed to, e.g., solve the lack of scalability in datasets with a large number of columns (or, e.g., number of different variables to be plotted against one another). In embodiments, a functional form of the multivariate normal (MVN) probability density function (PDF) can be used to determine the probability of pair plots or ranges of the chart containing one or more pair plots. In embodiments, at step 210, method 200 can include ordering the summands in the quadratic form of the MVN PDF. Ordering of the summands identifies which pair(s) of variables' values are most anomalous. In this manner, a limited number of anomalous variables' values can be identified (e.g., 3-10, or more than 10 or less than 3).

In embodiments, the MVN PDF can be represented by the equation:

$$\det(2\pi \Sigma)^{-\frac{1}{2}} \exp\left[-\frac{1}{2}(x-\mu)^T \Sigma^{-1}(x-\mu)\right]$$

By considering the precision-matrix-quadratic-form in the exponent:

$$(x-\mu)^T \underbrace{\sum^{-1}}_{\equiv \Lambda} \underbrace{(x-\mu)}_{\equiv u} = \begin{bmatrix} u_1 u_1 \Lambda_{11} & +u_1 u_2 \Lambda_{12} & +\ldots+ & u_1 u_D \Lambda_{1D} \\ +u_2 u_1 \Lambda_{21} & +u_2 u_2 \Lambda_{22} & +\ldots+ & u_2 u_D \Lambda_{2D} \\ \vdots & \vdots & \ddots & \vdots \\ +u_2 u_1 \Lambda_{21} & +u_2 u_2 \Lambda_{22} & +\ldots+ & u_2 u_D \Lambda_{2D} \end{bmatrix}$$

each summand gives a pair of columns' (or variables') contribution to the log-PDF, and picking the columns (variables) with the largest summands will identify the facets in the pair plot that are likely to depict or include anomalous data.

This identifies specific variables' values as anomalous or likely anomalous, reducing the number of potentially anomalous pair plots to identify and/or investigate, and/or reducing the number of pair plot charts to be rendered (e.g., pair plot charts that do not contain potentially anomalous data need not be charted). In the latter instance, the combination of coarsening and obviating the need to render additional charts preserves significant computational resources and time, as well as human time reviewing pair plots or visualizations thereof that do not contain the most (or any) anomalous data. This avoids the problem illustrated in, e.g., FIG. 1D, whereby an 18×18 series of plots must be rendered to allow for review of anomalous data, instead reducing the number of plots to those containing anomalous pair plots and/or where the particular column (or variable) was identified as one of the most anomalous. This could reduce the number of plots (or "facets") to examine from 324 (in an 18-column arrangement) to 9 (if only the 3 anomalous variables are selected) by excluding variables' values that are not anomalous or less anomalous.

Methodology 200 proceeds to 210 where a visualization of the coarsened data is generated. The visualization can be a depiction of the "bins" or rectangles (or other shape) containing a number of points therein. To represent the density of points in a coarsened area, an indicator can be assigned to each bin or area. In an embodiment, the indicator can be one of several colors, and a color can be assigned based on the number of points in the coarsened area. For example, lighter colors can represent a higher number of points in the bin, and darker numbers can represent a fewer number of points in the bin. Plotting a simple shape (such as a rectangle for a bin or area) consumes less computing resources than plotting the points therein individually.

Once the data is coarsened (and, in embodiments, anomalous data has been identified), the groups of coarsened data can be counted for the number of coarsened datapoints in each group, and the bins or areas can be plotted on a chart. Counting can be parallelized, further speeding up performance. In an example embodiment of parallelization, the data can be divided into many sections, then each processor can process it's section by counting the number of points in each bin. Because there are so many points, this is a computationally expensive operation. Then these counts can be summed together to compute the total number of points in each bin.

Determining a color scheme or color distribution can be based on an algorithm or user input associating a certain number or density of points with a particular color. In embodiments, colors beyond a certain threshold can be calibrated to correspond with variables' value ranges determined to be anomalous as described herein.

In embodiments, the facets or pair plot charts can be arranged as a graphical user interface to allow users to interact with each bin or area and explore points therein. In embodiments, users can view, export, or manipulate datapoints associated with a given area or bin to identify subsets of data.

Figure 5A:
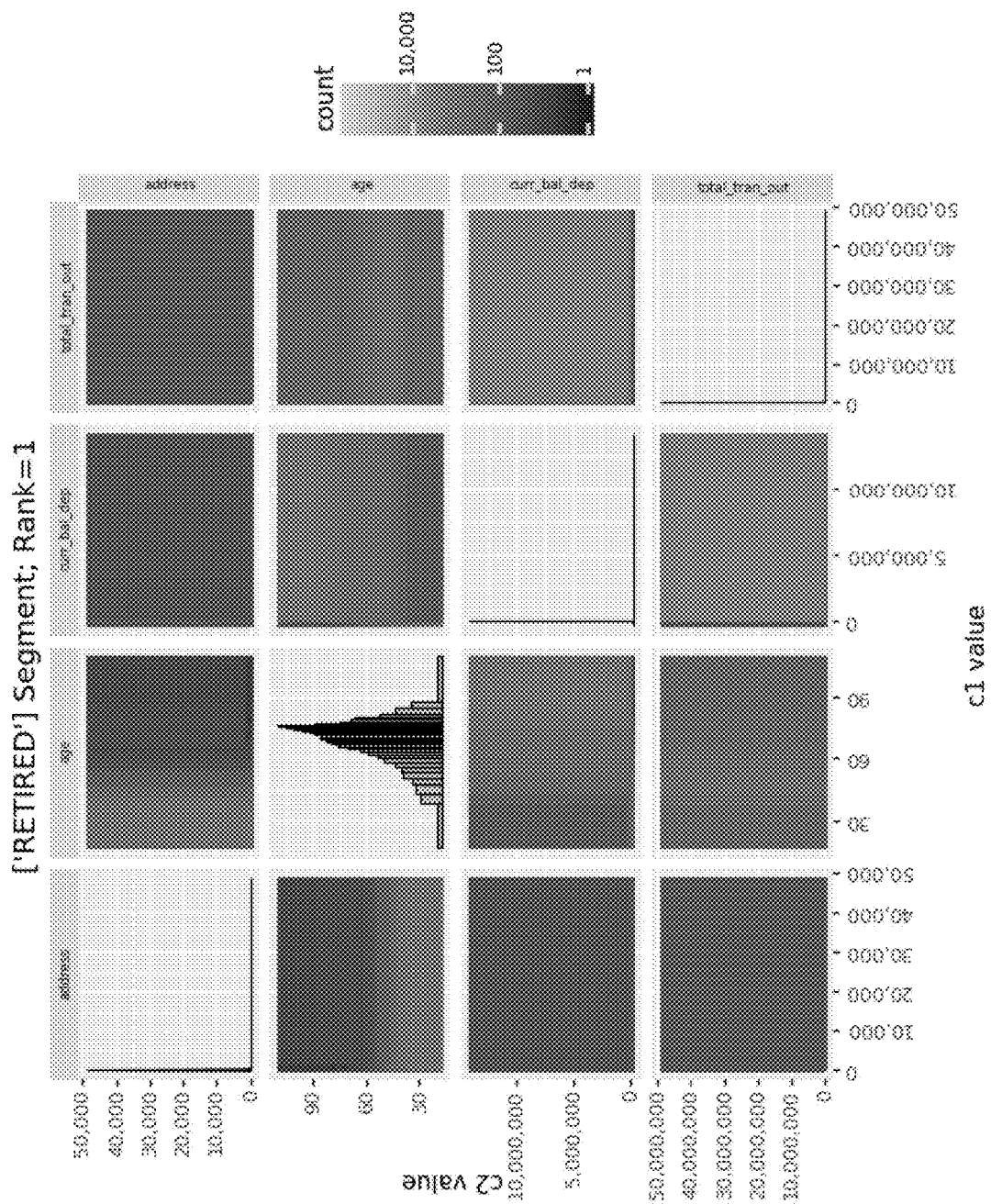
FIG. 5A depicts example charts generated using techniques disclosed herein.
Figure 5B:
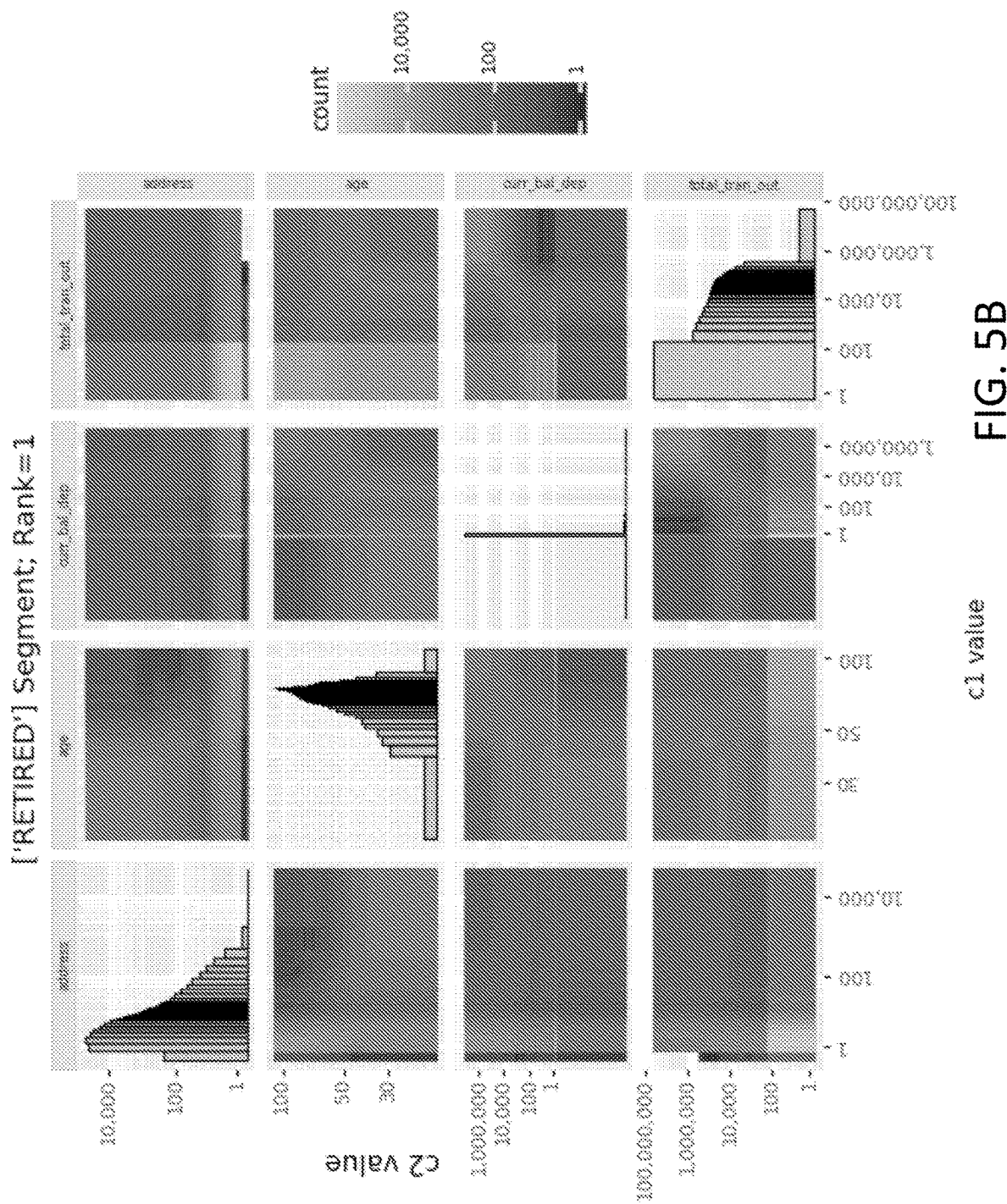
FIG. 5B depicts example charts generated using techniques disclosed herein.
Figure 5C:
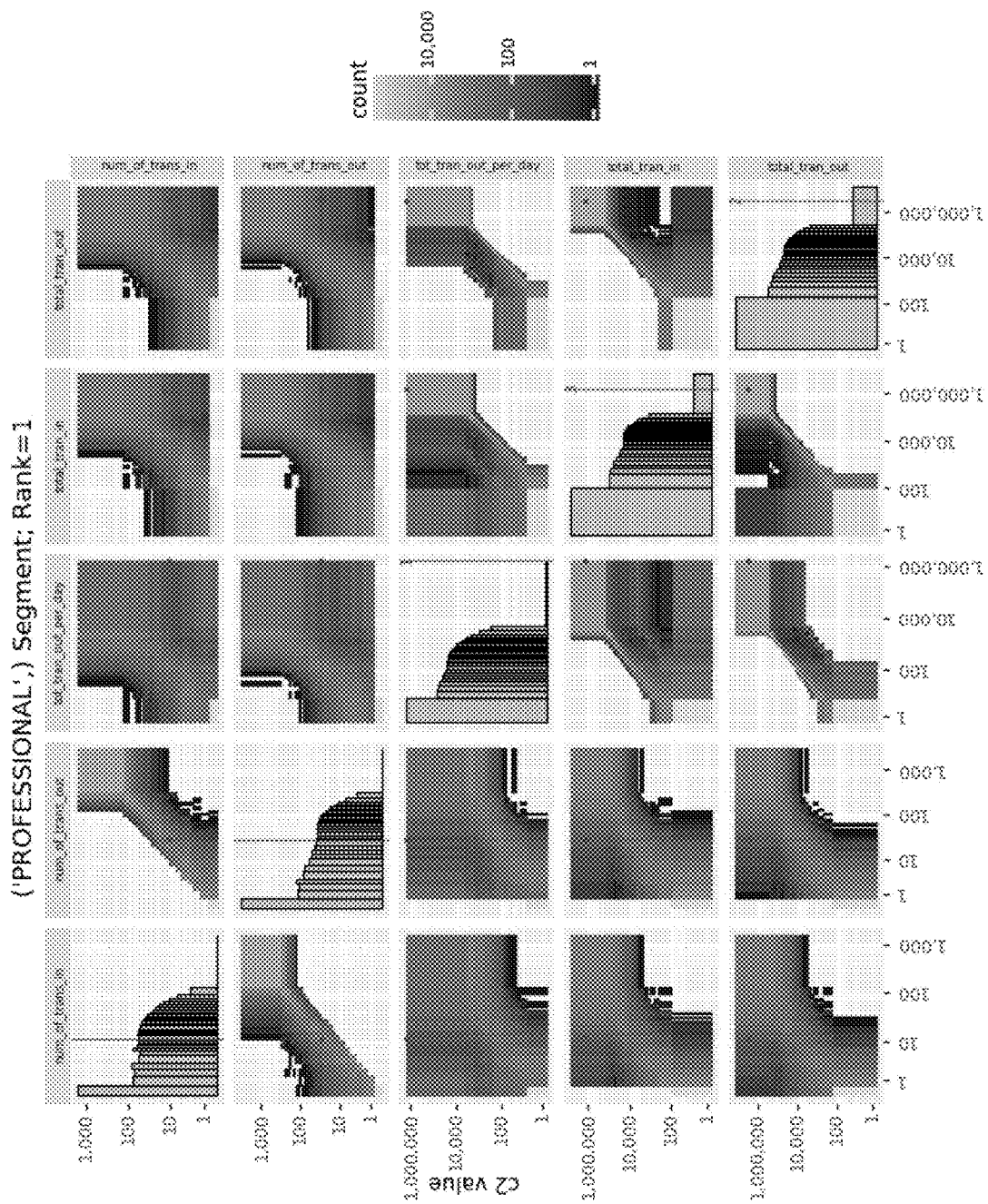
FIG. 5C depicts example charts generated using techniques disclosed herein.

Examples of visualizations generated at 210 including coarsened data are shown at FIG. 5A, FIG. 5B, and FIG. 5C hereafter.

After 210, methodology 200 can recycle to any prior step or terminate at 212.

Figure 3:
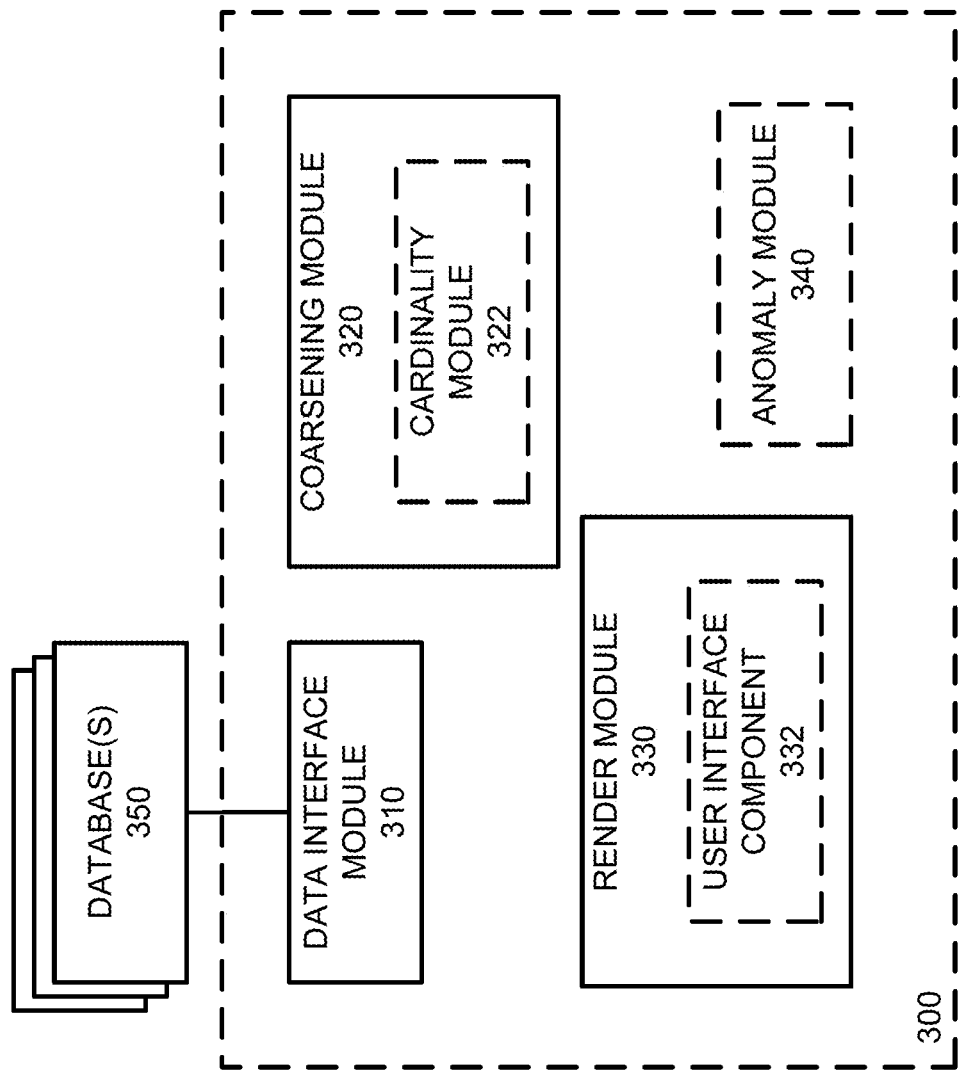
FIG. 3 depicts an example system disclosed herein.
Figure 4A:
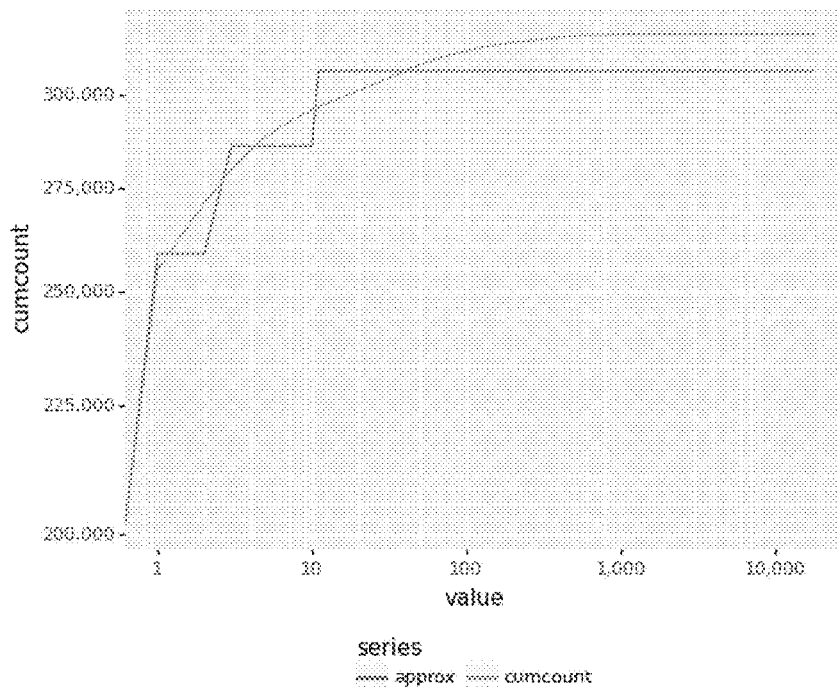
FIG. 4A depicts an illustration of a coarsening technique disclosed herein.
Figure 4B:
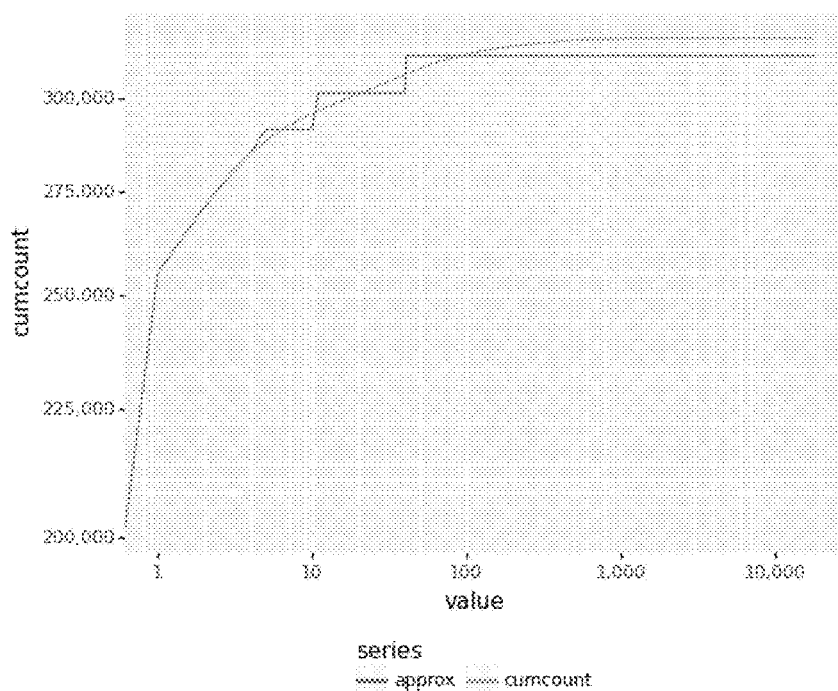
FIG. 4B depicts an illustration of a coarsening technique disclosed herein.
Figure 4C:
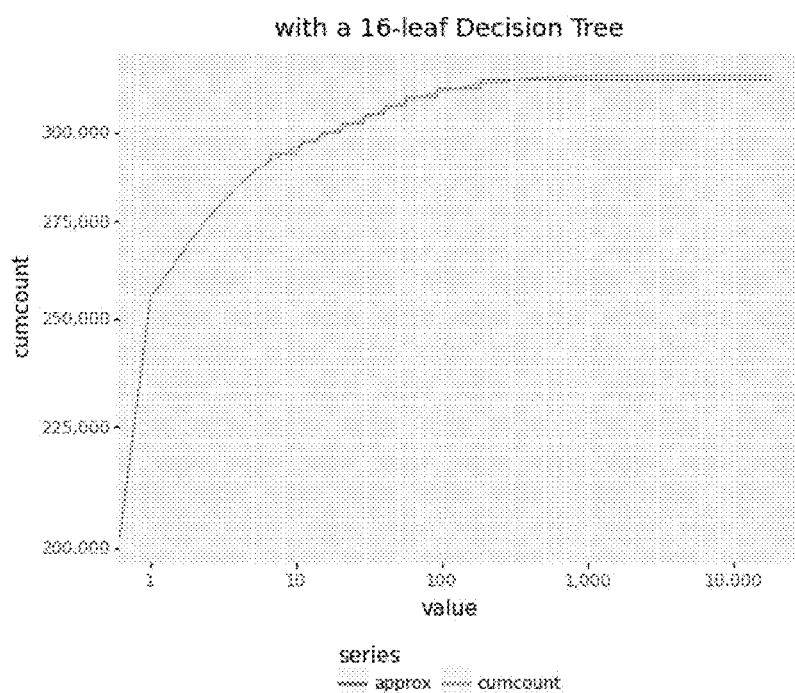
FIG. 4C depicts an illustration of a coarsening technique disclosed herein.
Figure 4D:
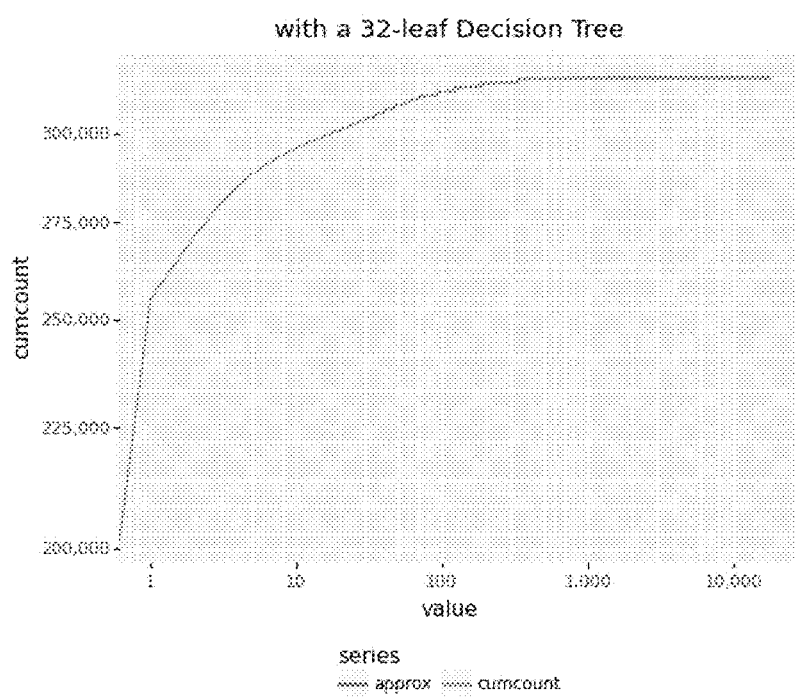
FIG. 4D depicts an illustration of a coarsening technique disclosed herein.

FIG. 3 illustrates an example system 300 configured to address the issues identified with respect to depicting and analyzing datasets such as those described in FIG. 1A and FIG. 1B. System 300 includes data interface module 310, coarsening module 320, and render module 330. In embodiments, system 300 includes anomaly module 340. System 300 is operatively coupled to (or, alternatively, can include) database(s) 350.

Data interface module 310 is configured to receive, ingest, or access data. In embodiments, data interface module can be configured to condition or normalize data for use in pair plotting. Data received through data interface module 310 can be any type of data that can be expressed in terms of two or more variables and corresponding values given conditions such that one or more pair plots can be generated using the values of the two or more variables.

Coarsening module 320 is configured to coarsen the data received from data interface module 310. Coarsening the data can, e.g., solve the lack of scalability in datasets with a large number of rows (or, e.g., number of different values or entries per variable). In embodiments, coarsening can be performed using a decision tree that coarsens the data into a relatively small number of "bins" or "areas." Such bins or areas can be defined by a leaf of a decision tree. For each pair of coarsened variables, the number of bins or areas could be, e.g., 50×50, or more, or less, such that problems relating to computationally rendering and physically displaying the chart representing tens of thousands (or more) points are avoided. While decision trees are described, other means of coarsening can be utilized without departing from the scope or spirit of the innovation. For example, different machine learning algorithms can be employed. In alternative or complementary embodiments, a k-means clustering algorithm could be used. In alternative or complementary embodiments, algorithms can determine a number of bins such that each bin has the same number of points therein, or that the point distribution among bins is weighted according to, e.g., standard deviations or other statistical analyses of the dataset.

In embodiments, values from pair plots can be represented using a floating point number in scientific notation, and coarsening module 320 can truncate the number after a certain decimal, to facilitate coarsening or discretization. The truncation can occur after any decimal point depending on the number of points and desired number of bins or areas representing coarsened data. Plotting this coarsened data becomes less computationally intensive due to the reduced precision required to determine the location of each plot (whether for plotting or for determining a coarsened bin to which the point should be captured in).

As discussed above, FIG. 4A, FIG. 4B, FIG. 4C, and FIG. 4D illustrate examples of coarsening using decision trees based on the number of leaves.

Coarsening module 320 can in embodiments include cardinality module 322. Cardinality module 322 can be configured to determine whether the data's cardinality has been reduced to an appropriate level. In an embodiment, the number of bins or areas can be set to an amount related to a proportion of a screen size or resolution. For example, a number of bins can be selected to plot all bins or areas in a single display with bin sizes of 20×20 pixels or larger. In embodiments, a cardinality can be selected, or can be user selectable. In embodiments, the number of areas or bins can be changed after rendering to allow for re-rendering based on a user input or determinations pertaining to a number or proportion of anomalous variables' values (see infra). While user cardinality module 322 is depicted in FIG. 3 as within coarsening module 320, cardinality module 332 can be implemented separately from coarsening module 320 without departing from the scope or spirit of the innovation.

In embodiments, a partitioning module can be implement within or separate from (while still interacting with) coarsening module 320 and/or cardinality module 322. In embodiments, a partitioning module can define bins before the data is coarsened to fit into those bins. As noted herein, the union of all of the bins can be all possible values that a variable associated with the bins can take. The partitioning module can define bins such that coarsening module 320 coarsens the values of the variables to fit within preexisting bins.

Render module 330 can be configured to generate a visualization of the coarsened data. The visualization can be a depiction of the "bins" or rectangles (or other shape) containing a number of points therein. To represent the density of points in a coarsened area, a color can be assigned based on the number of points in the coarsened area. For example, lighter colors can represent a higher number of points in the bin, and darker numbers can represent a fewer number of points in the bin. Plotting a simple shape (such as a rectangle for a bin or area) consumes less computing resources than plotting the points therein individually.

Render module 330 can be configured to determine or receive a color scheme or color distribution can be based on an algorithm or user input associating a certain number or density of points with a particular color. In embodiments, colors beyond a certain threshold can be calibrated to correspond with variables' value ranges determined to be anomalous as described herein.

Examples of visualizations generated by render module 330 including coarsened data are shown at FIG. 5A, FIG. 5B, and FIG. 5C hereafter.

Render module 330 can in embodiments include user interface module 332. User interface module can receive user input in relation to the generation of a visualization or changes to or interaction with a rendered visualization. System 300 can process the user input to modify the output of the visualization or provide information related thereto as described herein. While user interface module 332 is depicted in FIG. 3 as within render module 330, user interface module 332 can be implemented separately from render module 330 without departing from the scope or spirit of the innovation.

Anomaly module 340 can be configured to determine portions of data to be anomalous. This can include determining the probability of a particular pair plot occurring can be performed to, e.g., solve the lack of scalability in datasets with a large number of columns (or, e.g., number of different variables to be plotted against one another). In embodiments, a functional form of the multivariate normal (MVN) probability density function (PDF) can be used to determine the probability of pair plots or ranges of the chart containing one or more pair plots. In embodiments, at step 210, method 200 can include ordering the summands in the quadratic form of the MVN PDF. Ordering of the summands identifies which variables' values are most anomalous. In this manner, a limited number of anomalous variables' values can be identified (e.g., 3-10, or more than 10 or less than 3). The MVN PDF and precision-matrix-quadratic-form can be utilized by anomaly module 340 as described above to determine pair of variables' contribution to the log-PDF such that the largest summands identify or are likely to identify anomalous variables.

Anomaly module 340 is configured to identify specific variables' values, reducing the number of potentially anomalous pair plots to identify and/or investigate, and/or reducing the number of pair plot charts to be rendered. In the latter instance, the combination of coarsening and obviating the need to render additional charts preserves significant computational resources and time. This avoids the problem illustrated in, e.g., FIG. 1D, whereby an 18×18 series of plots must be rendered to allow for review of anomalous data, instead reducing the number of plots to those containing anomalous pair plots and/or where the particular column (or variable) was identified as one of the most anomalous. This could reduce the number of plots (or "facets") to examine from 324 (in an 18-column arrangement) to 9 (if only the 3 anomalous variables are selected) by excluding pairs that are not anomalous or less anomalous.

Figure 5D:
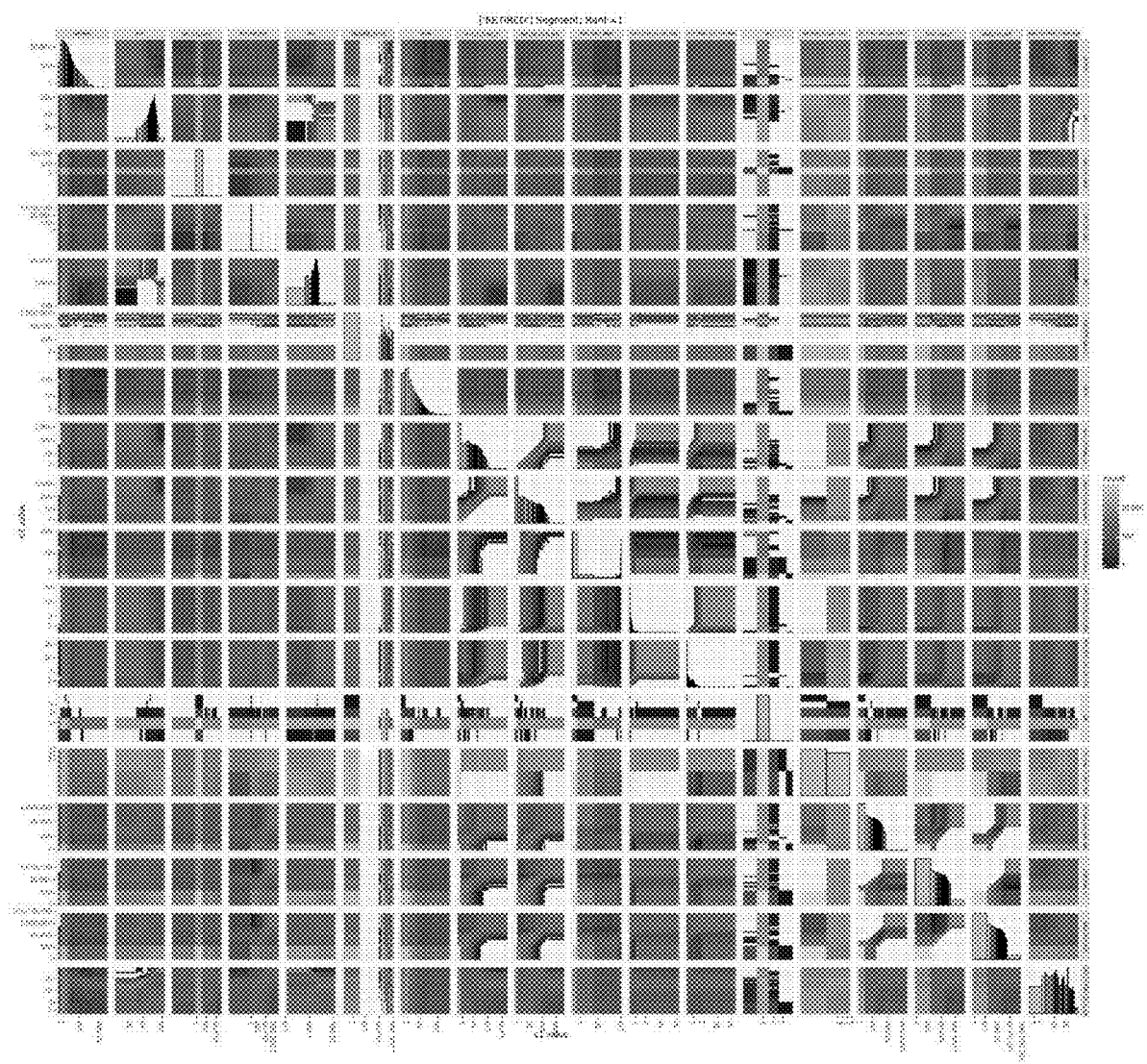
FIG. 5D depicts example charts generated using techniques disclosed herein.
Figure 6:
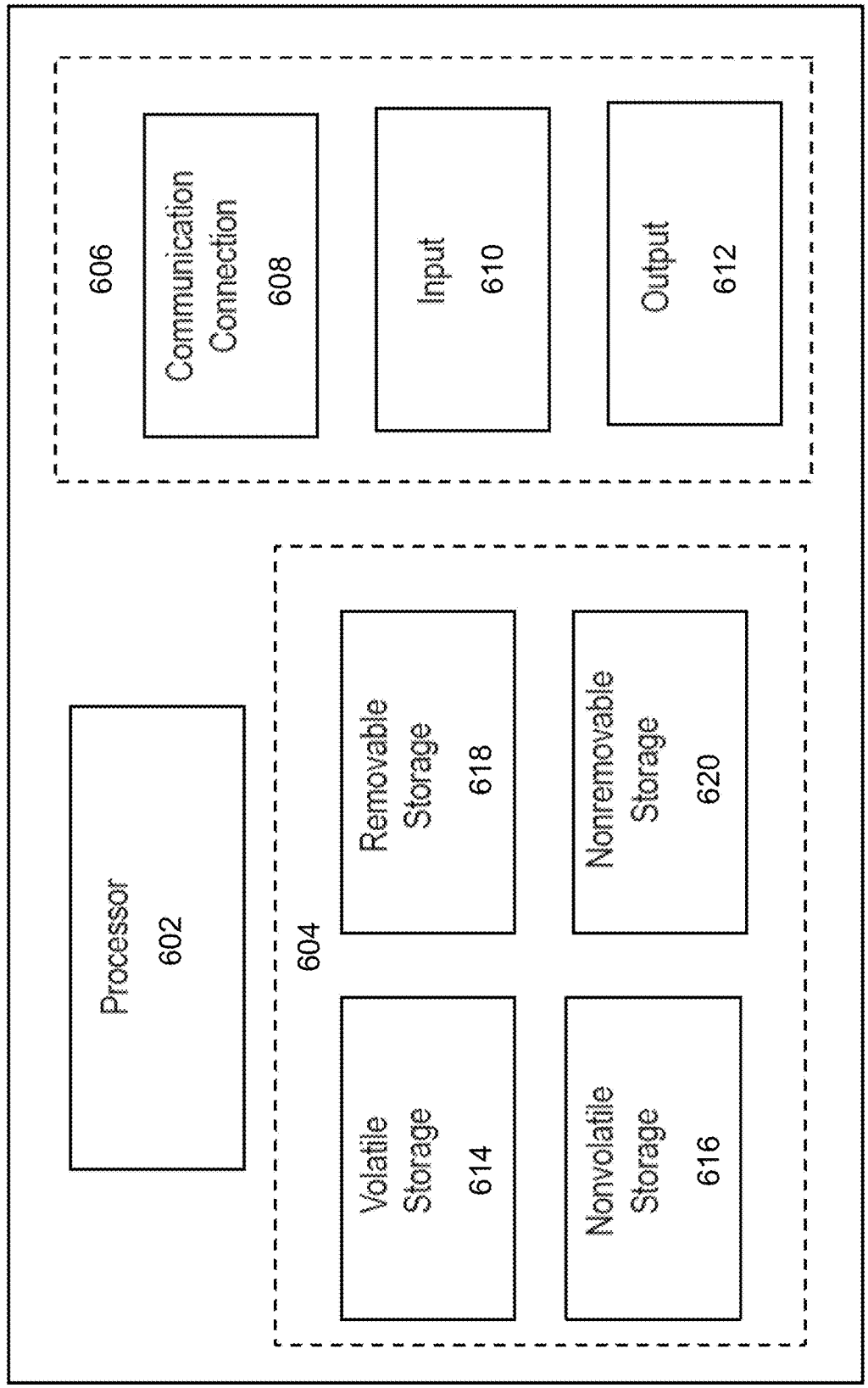
FIG. 6 depicts an example computing environment for implementing certain aspects disclosed herein.

FIG. 5A, FIG. 5B, FIG. 5C, and FIG. 5D illustrate example facets or charts utilizing the coarsening techniques described herein (in contrast with the facets/charts of FIG. 1C and FIG. 1D, which show plots that have not been coarsened. The diagonal (e.g., first column of the top row, second column of the second row, third column of the third row, and last column of the bottom row) represents the variable plotted against itself, and therefore only shows a distribution or nothing. (FIG. 5A, FIG. 5B, and FIG. 5C are provided only to serve as illustrative examples of plots that would be rendered and reviewed. The text and other detail are not necessary to the disclosure and should not be construed as limiting in any way. FIG. 5D is provided only to serve as an illustrative example of plots that would be rendered and reviewed for an 18-variable dataset with a large number of values per variable. FIG. 5D does not include any text or other detail relevant to the illustrative example.)

In particular, FIG. 5A depicts an example data plotting address, age, current deposit balance, and total transactions out for a "Retired" segment. In embodiments, the number of variables (or columns) could exceed four, but the data plotted may reflect the most anomalous pairs. As shown at right, the charts include a color gradient to indicate the count of instances (or rows) associated with each bin or area.

FIG. 5B also depicts an example data plotting address, age, current deposit balance, and total transactions out for a "Retired" segment using "log" scaling, the ticks on the x and y axes increase exponentially. In embodiments, the number of variables (or columns) could exceed four, but the data plotted may reflect the most anomalous pairs. As shown at right, the charts include a color gradient to indicate the count of instances (or rows) associated with each bin or area. The log scaling in FIG. 5B provides greater resolution in areas where the distribution is dense, so, for example, looking at the diagonal facets, the narrow rectangles on the left of the FIG. 5A facets become many wider rectangles in FIG. 5B. FIG. 5A and FIG. 5B were both generated with the same example data comprising 696,145 points, but any number of points can be represented according to the techniques described herein.

FIG. 5C shows a plot generated from different data, with pair plots from five variables, although any number of variables can be used and the number of plots rendered can depend on the anomaly detection techniques and ranking described herein. In the examples shown, FIG. 5C plots the 5 most anomalous columns from the most anomalous point in that data, while FIG. 5D plots the same anomalous point with all the columns. As can be appreciated, plotting just the most anomalous columns allows more immediate identification of these columns. In alternative embodiments other numbers of most anomalous columns can be plotted without departing from the scope or spirit of the innovation.

FIG. 5D shows an 18×18 set of plots utilizing coarsened data in comparison with FIG. 1D. As can be appreciated, coarsened data including color coding allows for identification of anomalous data and overall distributions than can be completed using individually plotted points, and allows visualization of a much higher number of bivariate charts than could be understood with a chart such as that illustrated in FIG. 1D.

As discussed above, the generation and rendering of facets or charts as shown in FIG. 5A, FIG. 5B, and FIG. 5C increases speed while reducing computing resources in several ways, including but not limited to reducing the amount and complexity of information to be rendered, permitting parallelization of processing in renders, and, in embodiments, reducing the number of charts generated from pair plots by generating charts for only anomalous (or most-anomalous) data. FIG. 5D is also faster and more efficient to render, but retains the 18×18 chart rendering.

Device 600 may comprise all or a part of system 300 and/or implement some or all of method 200. Device 600 may comprise hardware or a combination of hardware and software. The functionality to facilitate telecommunications via a telecommunications network may reside in one or combination of network devices 600. Device 600 depicted in FIG. 2 may represent or perform functionality of an appropriate device 600, or combination of network devices 600, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 2 is an example and not intended to imply a limitation to a specific implementation or configuration. Thus, device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 600 may comprise a processor 602 and a memory 604 coupled to processor 602. Memory 604 may contain executable instructions that, when executed by processor 602, cause processor 602 to effectuate operations associated with mapping wireless signal strength. As evident from the description herein, device 600 is not to be construed as software per se.

In addition to processor 602 and memory 604, device 600 may include an input/output system 606. Processor 602, memory 604, and input/output system 606 may be coupled together (coupling not shown in FIG. 2) to allow communications therebetween. Each portion of device 600 may comprise circuitry for performing functions associated with each respective portion. Thus, each portion may comprise hardware, or a combination of hardware and software. Accordingly, each portion of device 600 is not to be construed as software per se. Input/output system 606 may be capable of receiving or providing information from or to a communications device or other network entities configured for telecommunications. For example input/output system 606 may include a wireless communications (e.g., WiFi/2.6G/3G/4G/5G/GPS) card. Input/output system 606 may be capable of receiving or sending video information, audio information, control information, image information, data, or any combination thereof. Input/output system 606 may be capable of transferring information with device 600. In various configurations, input/output system 606 may receive or provide information via any appropriate means, such as, for example, optical means (e.g., infrared), electromagnetic means (e.g., radio frequency (RF), WiFi, Bluetooth®, Zig-Bee®), acoustic means (e.g., speaker, microphone, ultrasonic receiver, ultrasonic transmitter), or a combination thereof. In an example configuration, input/output system 606 may comprise a WiFi finder, a two-way GPS chipset or equivalent, or the like, or a combination thereof.

Input/output system 606 of device 600 also may contain communication connection 608 that allows device 600 to communicate with other devices, network entities, or the like. Communication connection 608 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for processing broadcast messages, as described herein. For example, processor 602 may be capable of, in conjunction with any other portion of device 600, determining a type of broadcast message and acting according to the broadcast message type or content, as described herein.

Memory 604 of device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of random access memory), a nonvolatile storage 616 (such as ROM, flash memory), or a combination thereof. Memory 604 may include additional storage (e.g., a removable storage 618 or a nonremovable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 600. Memory 604 may comprise executable instructions that, when executed by processor 602, cause processor 602 to effectuate operations to map signal strengths in an area of interest.

Figure 7:
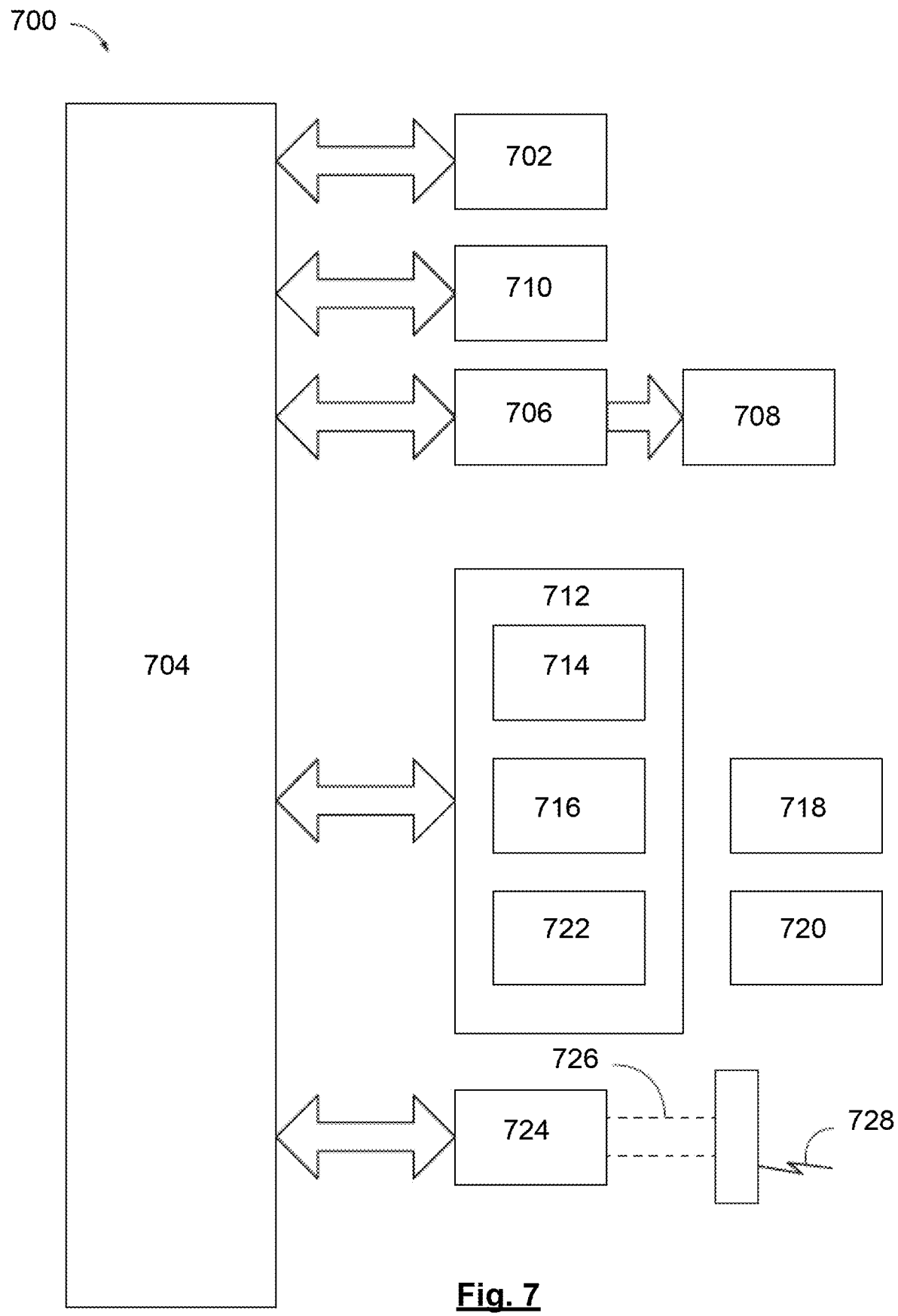
FIG. 7 depicts an example network environment for implementing certain aspects disclosed herein.

FIG. 7 illustrates a computer-based system 700 that may constitute or include parts of system 300 and/or implement some or all of method 200. Computer-based system 700 includes at least one processor, such as a processor 702. Processor 702 may be connected to a communication infrastructure 704, for example, a communications bus, a crossover bar, a network, or the like. Various software aspects are described in terms of this example computer-based system 700. Upon perusal of the present description, it will become apparent to a person skilled in the relevant art(s) how to implement the present disclosure using other computer systems or architectures.

Computer-based system 700 includes a display interface 706 that forwards graphics, text, or other data from communication infrastructure 704 or from a frame buffer (not shown) for display on a display unit 708.

Computer-based system 700 further includes a main memory 710, such as random access memory (RAM), and may also include a secondary memory 712. Secondary memory 712 may further include, for example, a hard disk drive 714 or a removable storage drive 716, representing a floppy disk drive, a magnetic tape drive, an optical disk drive, etc. Removable storage drive 716 reads from or writes to a removable storage unit 718 in a well-known manner. Removable storage unit 718 may represent a floppy disk, magnetic tape, or an optical disk, and may be read by and written to by removable storage drive 716. As will be appreciated, removable storage unit 718 includes a computer usable storage medium having computer software or data stored therein.

In accordance with various aspects of the present disclosure, secondary memory 712 may include other similar devices for allowing computer programs or other instructions to be loaded into computer-based system 700. Such devices may include, for example, a removable storage unit 720 and an interface 722. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 720 to computer-based system 700.

Computer-based system 700 may further include communication interface 724. Communication interface 724 may allow software or data to be transferred between computer-based system 700 and external devices. Examples of communication interface 724 include, but may not be limited to a modem, a network interface (such as an Ethernet card), a communications port, a Personal Computer Memory Card International Association (PCMCIA) slot and card, or the like. Software or data transferred via communication interface 724 may be in the form of a number of signals, hereinafter referred to as signals 726, which may be electronic, electromagnetic, optical or other signals capable of being received by communication interface 724. Signals 726 may be provided to communication interface 724 via a communication path (e.g., channel) 728. Communication path 728 carries signals 726 and may be implemented using wire or cable, fiber optics, a telephone line, a cellular link, an RF link, or other communication channels.

In this document, the terms "computer program medium" and "computer usable medium" are used to generally refer to media such as removable storage drive 716, a hard disk installed in hard disk drive 714, or the like. These computer program products provide software to computer-based system 700. The present disclosure is directed to such computer program products.

Computer programs (also referred to as computer control logic) may be stored in main memory 710 or secondary memory 712. The computer programs may also be received via communication interface 704. Such computer programs, when executed, enable computer-based system 700 to perform the functions consistent with the present disclosure, as discussed herein. In particular, the computer programs, when executed, enable processor 702 to perform the features of the present disclosure. Accordingly, such computer programs represent controllers of computer-based system 700.

In accordance with an aspect of the present disclosure, where the disclosure is implemented using a software, the software may be stored in a computer program product and loaded into computer-based system 700 using removable storage drive 716, hard disk drive 714, or communication interface 724. The control logic (software), when executed by processor 702, causes processor 702 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

A "module" or "component" herein can refer to a portion of a system, implemented locally or remotely or in combinations of local and remote systems, configured to perform a function that can be implemented using software, hardware, or combinations thereof in the above-described computing and network environments.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special purpose computer, or other programmable data-processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network based portal.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A method, comprising:
    accessing a database including a first variable and a second variable and a plurality of entries associated with the first variable and the second variable, wherein each of the plurality of entries contains a first value corresponding to the first variable and a second value corresponding to the second variable;
    coarsening the plurality of entries by assigning each first value to one of a first plurality of bins and assigning each second value to one of a second plurality of bins, wherein each of the first plurality of bins corresponds to a range of values for each first value and each of the second plurality of bins corresponds to a range of values for each second value; and
    rendering a chart depicting a visualization of pair plots of the first plurality of bins against the second plurality of bins, wherein each pair plot covers an area of the chart encompassing where each range of values would be plotted, and wherein the visualization of the plurality of bins respectively includes an indicator of a number of entries represented by each of the plurality of bins.

2. The method of claim 1,
wherein the coarsening is performed using a decision tree.

3. The method of claim 1,
wherein the indicator is a color within a gradient of color, wherein a first extreme of the gradient represents the lowest number of entries in any of the plurality of bins, and wherein a second extreme of the gradient represents a highest number of entries in any of the plurality of bins.

4. The method of claim 1, comprising:
    determining that the number of bins in the plurality of bins is above a threshold; and
    coarsening the plurality of entries by assigning each first value to one of a third plurality of bins and assigning each second value to one of a fourth plurality of bins, wherein each of the third plurality of bins corresponds to a range of values for each first value and each of the fourth plurality of bins corresponds to a range of values for each second value, wherein the number of bins in the third plurality of bins is less than a number of bins in the second plurality of bins, and wherein the number of bins in the fourth plurality of bins is less than a number of bins in the first plurality of bins.

5. The method of claim 1, comprising:
determining that the first variable is anomalous.

6. The method of claim 5,
wherein determining that the first variable is anomalous is performed using a multivariate-normal probability density function.

7. The method of claim 1, comprising:
receiving a user input from a graphical user interface associated with the chart.

8. The method of claim 7, comprising:
modifying the chart based on the input from the graphical user interface.

9. The method of claim 7, comprising:
retrieving data associated with one of the plurality of pair plots, wherein the user input comprises selection of one of the pair plots.

10. A system, comprising:
    a data interface module configured to access a database including a first variable and a second variable and a plurality of entries associated with the first variable and the second variable, wherein each of the plurality of entries contains a first value corresponding to the first variable and a second value corresponding to the second variable a coarsening module configured to coarsen the plurality of entries by assigning each first value to one of a first plurality of bins and assigning each second value to one of a second plurality of bins, wherein each of the first plurality of bins corresponds to a range of values for each first value and each of the second plurality of bins corresponds to a range of values for each second value; and a rendering module configured to render a chart depicting a visualization of pair plots of the first plurality of bins against the second plurality of bins, wherein each pair plot covers an area of the chart encompassing where each range of values would be plotted, and wherein the visualization of the plurality of bins respectively includes an indicator of a number of entries represented by each of the plurality of bins.

11. The system of claim 10, wherein the coarsening module utilizes a decision tree.

12. The system of claim 10, wherein the indicator is a color within a gradient of color, wherein a first extreme of the gradient represents the lowest number of entries in any of the plurality of bins, and wherein a second extreme of the gradient represents a highest number of entries in any of the plurality of bins.

13. The system of claim 10, comprising:
a cardinality module configured to determine that the number of bins in the plurality of bins is above a threshold; and
cause the coarsening module to coarsen the plurality of entries by assigning each first value to one of a third plurality of bins and assigning each second value to one of a fourth plurality of bins, wherein each of the third plurality of bins corresponds to a range of values for each first value and each of the fourth plurality of bins corresponds to a range of values for each second value, wherein the number of bins in the third plurality of bins is less than a number of bins in the second plurality of bins, and wherein the number of bins in the fourth plurality of bins is less than a number of bins in the first plurality of bins.

14. The system of claim 10, comprising:
an anomaly module configured to determine that the first variable is anomalous.

15. The system of claim 14, wherein the anomaly module utilizes a multivariate-normal probability density function.

16. The system of claim 10, comprising:
a user interface component configured to receive a user input from a graphical user interface associated with the chart.

17. The system of claim 16, wherein the user interface component causes retrieving of data associated with one of the plurality of pair plots, wherein the user input comprises selection of one of the pair plots.

18. A non-transitory computer-readable medium storing instructions that when executed by a processor perform operations effectuating:
accessing a database including a first variable and a second variable and a plurality of entries associated with the first variable and the second variable, wherein each of the plurality of entries contains a first value corresponding to the first variable and a second value corresponding to the second variable;
coarsening the plurality of entries by assigning each first value to one of a first plurality of bins and assigning each second value to one of a second plurality of bins, wherein each of the first plurality of bins corresponds to a range of values for each first value and each of the second plurality of bins corresponds to a range of values for each second value; and
rendering a chart depicting a visualization of pair plots of the first plurality of bins against the second plurality of bins, wherein each pair plot covers an area of the chart encompassing where each range of values would be plotted, and wherein the visualization of the plurality of bins respectively includes an indicator of a number of entries represented by each of the plurality of bins.

19. The non-transitory computer-readable medium of claim 18, wherein the instructions when executed by the processor perform operations effectuating:
determining that the first variable is anomalous.

20. The non-transitory computer-readable medium of claim 18, wherein determining that the first variable is anomalous is performed using a multivariate-normal probability density function.

* * * * *